*Francis Andrews — Horse Hay-Rake.*
116,254 PATENTED JUN 27 1871
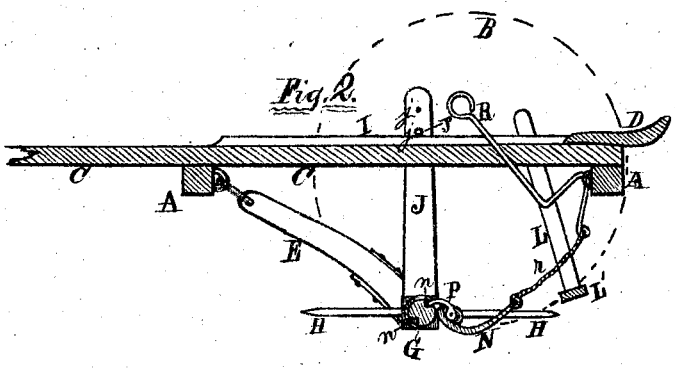
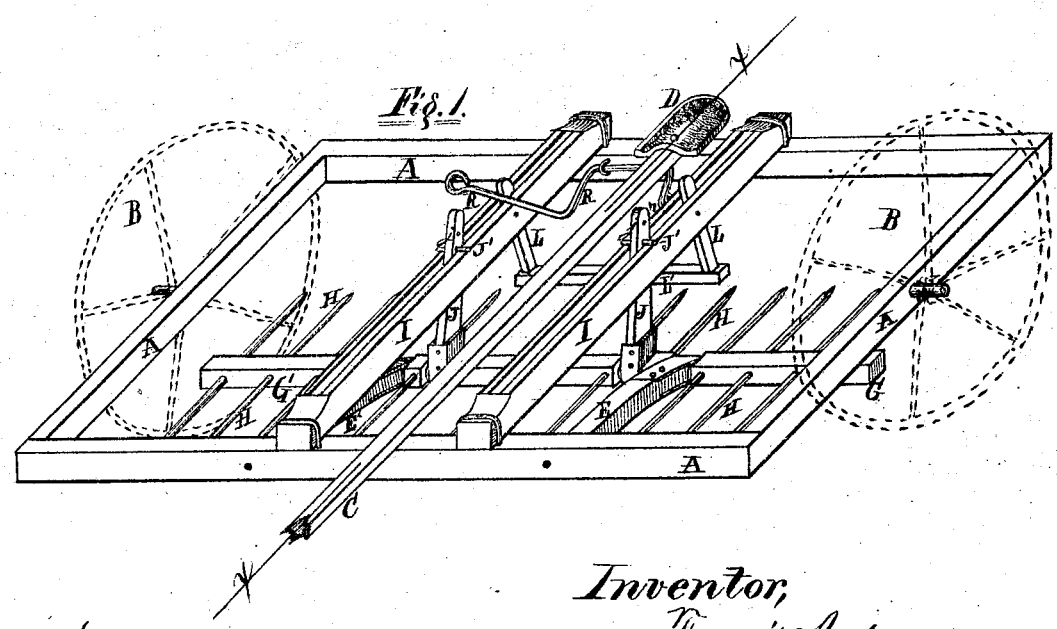
Witnesses:
Platt R. Richards.
D. H. Clarke.
Inventor,
Francis Andrews,
by W. B. Richards,
his Atty

UNITED STATES PATENT OFFICE.

FRANCIS ANDREWS, OF GALESBURG, ILLINOIS.

IMPROVEMENT IN HORSE HAY-RAKES.

Specification forming part of Letters Patent No. 116,254, dated June 27, 1871.

*To all whom it may concern:*

Be it known that I, FRANCIS ANDREWS, of Galesburg, in the county of Knox and State of Illinois, have invented certain Improvements in Horse Hay-Rakes, of which the following is a specification:

The nature of my invention relates to improvements in that class of revolving rakes known as sulky-rakes, in which the rake is attached by swinging arms to a main frame, which frame is carried on wheels and provided with a seat for the driver; and the invention consists in the combination of devices with the rake and main frame for holding the rake from revolving, and for releasing and revolving it at the desired time, all as hereinafter fully described.

Figure 1 is a perspective view of a machine embodying my invention. Fig. 2 is a vertical cross-section of Fig. 1 on the plane of the line $xx$.

A represents a rectangular frame mounted on the wheels B B, and carrying a draft-pole, C, and driver's seat D. E E are swinging-bars, carrying the rake at their rear ends, and attached to the front piece of the frame A by links and staples, as shown in the drawing, so that their rear ends may be freely oscillated in a vertical direction. G is the rake-head, having the usual bearings in the bars E E at their rear ends. H H H H are the rake-teeth. I I are slotted bars attached to the top of the frame A, as shown. J J are bars with bands surrounding journals on the rake-head G, and their upper parts passing through the slots in the bars I I. The bars J J are pierced with a series of holes, $jjjj$, through which a pin, J', passes, and by which the height of the rake-head G, and consequently the slope of the teeth H, may be regulated as is required in different kinds of hay, cornstalks, &c.; or the bars J J may be raised high enough and the pins J' inserted to hold the rake entirely free from the ground in passing from field to field, or otherwise. L L are bars, pivoted at their upper ends in the slots in the bars I I, and connected at their lower ends by a cross-bar, L', on which the feet of the driver may rest, and which he may swing or hold over the rear ends of the rake-teeth H to keep them from revolving, and which he may swing back off the teeth when it is desired to revolve the rake and discharge it. N is a lever, its forward end partly encircling the central portion of the rake-head G, and carrying a pawl, P, which operates through a slot in the end of the lever N and engages with teeth $nn$ when it is desired to revolve the rake by lifting the rear end of the lever N. R is a hand-lever, curved as shown in the drawing, and pivoted to the rear side of the frame A, its lower end connected, by a chain or cord, $r$, with the free end of the lever N. By means of the levers R and N it will be plainly seen that the driver may revolve the rake at his pleasure.

I claim as my invention—

The combination and arrangement of the levers N and R, pawl P, and cord $r$, and bars L L L' with frame A, slotted bars I I, swinging bars E E, and carrying-bars J J, substantially as described, and for the purpose set forth.

FRANCIS ANDREWS.

Witnesses:
PLATT R. RICHARDS,
ROBERT H. AVERY.